(12) United States Patent
Kim et al.

(10) Patent No.: US 7,553,588 B2
(45) Date of Patent: *Jun. 30, 2009

(54) NON-AQUEOUS ELECTROLYTE AND A LITHIUM SECONDARY BATTERY COMPRISING THE SAME

(75) Inventors: Jin-Hee Kim, Seoul (KR); Jin-Sung Kim, Che nan (KR); Sang-Moon Hwang, Cheonan (KR); Meen-Seon Paik, Cheonan (KR); Hak-Soo Kim, Kumi (KR)

(73) Assignees: Samsung SDI Co., Ltd., Suwon-si (KR); Cheil Industries Inc., Kumi-si (KR)

( * ) Notice: Subject to any disclaimer, the term of this patent is extended or adjusted under 35 U.S.C. 154(b) by 587 days.

This patent is subject to a terminal disclaimer.

(21) Appl. No.: 10/658,272

(22) Filed: Sep. 10, 2003

(65) Prior Publication Data

US 2004/0185347 A1  Sep. 23, 2004

(30) Foreign Application Priority Data

Mar. 13, 2003  (KR)  ..................... 10-2003-0015749

(51) Int. Cl.
   *H01M 6/18* (2006.01)
(52) U.S. Cl. .................. 429/307; 429/326; 429/330; 429/332; 429/328; 429/329; 429/336; 429/337
(58) Field of Classification Search .............. 429/307, 429/326, 330, 332, 328, 329, 336, 337
See application file for complete search history.

(56) References Cited

U.S. PATENT DOCUMENTS

| | | | |
|---|---|---|---|
| 4,489,145 A * | 12/1984 | Abraham et al. | 429/336 |
| 4,670,363 A * | 6/1987 | Whitney et al. | 429/328 |
| 5,030,528 A * | 7/1991 | Shen et al. | 429/330 |
| 5,223,353 A * | 6/1993 | Ohsawa et al. | 429/307 |
| 5,879,834 A | 3/1999 | Mao | |
| 6,074,777 A | 6/2000 | Reimers et al. | |
| 6,787,269 B2 * | 9/2004 | Sekino et al. | 429/330 |

(Continued)

FOREIGN PATENT DOCUMENTS

EP  0759641 A1  2/1997

(Continued)

OTHER PUBLICATIONS

Sid Megahed and Bruno Scrosati; Lithium-ion rechargeable batteries; Journal of Power Sources, 51 (1994) pp. 79-104.

(Continued)

*Primary Examiner*—Laura S Weiner
(74) *Attorney, Agent, or Firm*—Stein McEwen, LLP

(57) ABSTRACT

An electrolyte for a lithium secondary battery includes lithium salts, a non-aqueous organic solvent, and additive compounds. The additive compounds added to the electrolyte of the present invention decompose earlier than the organic solvent to form a conductive polymer layer on the surface of a positive electrode, and prevent decomposition of the organic solvent. Accordingly, the electrolyte inhibits gas generation caused by decomposition of the organic solvent at initial charging, and thus reduces an increase of internal pressure and swelling during high temperature storage, and also improves safety of the battery during overcharge.

19 Claims, 5 Drawing Sheets

U.S. PATENT DOCUMENTS

| | | | | |
|---|---|---|---|---|
| 7,150,944 B2 | * | 12/2006 | Song et al. | 429/338 |
| 7,223,500 B2 | * | 5/2007 | Noh et al. | 429/307 |
| 2004/0197667 A1 | * | 10/2004 | Noh et al. | 429/330 |

FOREIGN PATENT DOCUMENTS

| | | | |
|---|---|---|---|
| EP | 0776058 A2 | | 5/1997 |
| EP | 1335445 A1 | | 8/2003 |
| EP | 1361622 A1 | | 11/2003 |
| JP | 61-230276 | | 10/1986 |
| JP | 62-160671 | * | 7/1987 |
| JP | 4-56079 | * | 2/1992 |
| JP | 7-169505 | | 7/1995 |
| JP | 7-192756 | * | 7/1995 |
| JP | 07-320779 | | 12/1995 |
| JP | 08-064238 | | 3/1996 |
| JP | 8-138735 | * | 5/1996 |
| JP | 08-321312 | | 12/1996 |
| JP | 09-073918 | | 3/1997 |
| JP | 9-204932 | | 8/1997 |
| JP | 10-21958 | * | 1/1998 |
| JP | 11-40194 | * | 2/1999 |
| JP | 2000-58117 | | 2/2000 |
| JP | 2000-156243 | | 6/2000 |
| JP | 2001-15172 | | 1/2001 |
| JP | 2001-015172 | * | 1/2001 |
| JP | 2002-075446 | | 3/2002 |
| JP | 2002-124298 | * | 4/2002 |
| JP | 2002-280065 | | 9/2002 |
| JP | 2002-359002 | * | 12/2002 |
| WO | WO 02/054524 A1 | | 7/2002 |

OTHER PUBLICATIONS

C.R. Yang, Y.Y. Wang, and C.C. Wan; Composition analysis of the passive film on the carbon electrode of a lithium-ion battery with an EC-based electrolyte; Journal of Power Sources 72 (1998) pp. 66-70.

Möller, K.-C., et al. "In situ characterization of the SEI formation on graphite in the presence of a vinylene group containing film-forming electrolyte additives", Jun. 1, 2003, Journal of Power Sources, vol. 119-121, pp. 561-566.

Arimura, Tomoaki, et al., "The effect of additives on the ionic conductivity performances of perfluoroalkyl sulfonated ionomer membranes", Mar. 1, 1999, Solid State Ionics, vol. 118, pp. 1-10.

Wang, Congxiao, et al., "Electrochemical behaviour of a graphite electrode in propylene carbonate and 1,3-benzodioxol-2-one based electrolyte system", Jul. 15, 1998, Journal of Power Sources, vol. 74, pp. 142-145.

Matsuda, Yoshiharu, "Behavior of lithium/electrolyte interface in organic solutions", 1993, Journal of Power Sources, vol. 43-44, pp. 1-7.

Matsuda, Yoshiharu, et al. "Organic additives for the electrolytes of rechargeable lithium batteries", May 16, 1989, Journal of Power Sources, vol. 26, pp. 679-583.

* cited by examiner

NON-AQUEOUS ELECTROLYTE AND A LITHIUM SECONDARY BATTERY COMPRISING THE SAME

CROSS-REFERENCE TO RELATED APPLICATIONS

This application claims the benefit of Korean Application No. 2003-15749, filed Mar. 13, 2003, in the Korean Intellectual Property Office, the disclosure of which is incorporated herein by reference.

BACKGROUND OF THE INVENTION

1. Field of the Invention

The present invention relates to a non-aqueous electrolyte and a lithium secondary battery comprising the same, and more particularly, to a non-aqueous electrolyte for a lithium secondary battery that prevents a battery from expanding when being stored at a high temperature, while maintaining the electrochemical properties and improving the safety of the battery.

2. Description of the Related Art

Due to recent trends toward more compact and lighter portable electronic equipment, there has been a growing need to develop a high performance and large capacity battery to power the portable electronic equipment. In particular, there has been extensive research to provide lithium secondary batteries with good safety characteristics and improved electrochemical properties. Lithium secondary batteries use materials that reversibly intercalate or deintercalate lithium ions during charge and discharge reactions for both positive and negative active materials. The positive active materials include lithium metal oxide, and the negative active materials include lithium metals, lithium-containing alloys, or materials that lithium ions such as crystalline or amorphous carbons, or carbon-containing composites.

A cross-sectional view of a general non-aqueous Li-ion cell is shown in FIG. 1. The Li-ion cell 1 is fabricated by inserting an electrode assembly 8 including a positive electrode 2, a negative electrode 4, and a separator 6 between the positive and negative electrodes into a battery case 10. An electrolyte 26 is injected into the battery case 10 and impregnated into the separator 6. The upper part of the case 10 is sealed with a cap plate 12 and a sealing gasket 14. The cap plate 12 has a safety vent 16 to release pressure. A positive electrode tab 18 and a negative electrode tab 20 are attached to the positive electrode 2 and negative electrode 4, respectively. Insulators 22 and 24 are installed on the lower part and the side part of the electrode assembly 8 to prevent a short circuit occurrence in the battery.

The average discharge voltage of a lithium secondary battery is about 3.6 to 3.7 V, which is higher than other alkali batteries, Ni-MH batteries, Ni—Cd batteries, and the like. An electrolyte that is electrochemically stable in the charge and discharge voltage range of 0 to 4.2 V is required to generate the high driving voltage needed. As a result, a mixture of non-aqueous carbonate-based solvents, such as ethylene carbonate, dimethyl carbonate, diethyl carbonate, and the like, is used as an electrolyte. However, such an electrolyte has significantly lower ion conductivity than an aqueous electrolyte that is used in a Ni-MH battery or a Ni—Cd battery, thus resulting in the deterioration of battery characteristics during charging and discharging at a high rate.

During the initial charge of a lithium secondary battery, lithium ions, which are released from the lithium-transition metal oxide positive electrode of the battery, are transferred to a carbon negative electrode where the ions are intercalated into the carbon. Since lithium has a high reactivity, lithium reacts with the carbon negative electrode to produce $Li_2CO_3$, LiO, LiOH, and the like, thus forming a thin film on the surface of the negative electrode. The film is referred to as an organic solid electrolyte interface (SEI) film. The organic SEI film formed during the initial charge not only prevents the reaction between lithium ions and the carbon negative electrode or other materials during charging and discharging, but also acts as an ion tunnel, allowing the passage of only lithium ions. The ion tunnel prevents disintegration of the structure of the carbon negative electrode, which is caused by co-intercalation of organic solvents having a high molecular weight along with solvated lithium ions, into the carbon negative electrode.

Once the organic SEI film is formed, lithium ions do not react again with the carbon electrode or other materials, so that an amount of lithium ions is maintained. That is, the carbon of the negative electrode reacts with an electrolyte during the initial charging, thus forming a passivation layer such as an organic SEI film on the surface of the negative electrode such that the electrolyte solution no longer decomposes, and stable charging and discharging are maintained (*J. Power Sources*, 51(1994), 79-104). Hence, in the lithium secondary battery, there is no irreversible formation reaction of the passivation layer, and a stable cycle life after the initial charging reaction is maintained.

However, gases are generated inside the battery due to decomposition of a carbonate-based organic solvent during the organic SEI film-forming reaction (*J. Power Sources*, 72(1998), 66-70). The gases include $H_2$, CO, $CO_2$, $CH_4$, $C_2H_6$, $C_3H_8$, $C_3H_6$, and the like, depending on the type of non-aqueous organic solvent and the negative active material used. The thickness of the battery increases during charging due to the generation of gas inside the battery, and the passivation layer is slowly disintegrated by electrochemical energy and heat energy, which increases with the passage of time when the battery is stored at a high temperature after being charged. Accordingly, a side reaction in which an exposed surface of the negative electrode reacts with surrounding electrolyte occurs continuously.

The above problems occur in a positive electrode. At initial charging, positive active material reacts with electrolyte to form a passivation layer on the positive electrode, and the passivation layer prevents decomposition of electrolyte, resulting in maintenance of stable charge-discharge. As in the negative electrode, the charge consumed during formation of the passivation layer on the positive electrode is irreversible. Thus, in a lithium ion battery, there is no irreversible formation reaction of the passivation layer, and a stable cycle life after the initial charging reaction is maintained.

However, the passivation layer is slowly disintegrated by electrochemical energy and heat energy, which increase with the passage of time when the fully charged battery is stored at high temperatures after being charged, for example, if the battery is stored at 85° C. for four days after a 100% charge at 4.2 V. Accordingly, a side reaction in which an exposed surface of the positive electrode reacts with surrounding electrolyte occurs continuously to generate gases. The generated gases include CO, $CO_2$, $CH_4$, $C_2H_6$, and the like, from decomposition of a carbonate-based solvent.

The internal pressure of the battery increases with the generation of gases in both positive and negative electrodes. The increase in the internal pressure induces the deformation of prismatic and lithium polymer batteries. As a result, regional differences in the cohesion among electrodes inside the electrode assembly (positive and negative electrodes, and separator) of the battery occur, thus deteriorating the performance and safety of the battery and causing difficulty in mounting the lithium secondary battery set into electronic equipment.

Further, disintegration of the passivation layer due to an increase of electric or thermal energy results in a continuous side reaction between positive and negative electrodes and the electrode. Gases generated from the side reaction increase internal pressure inside the battery and incur deformation of the battery to induce a short or a thermal runaway.

For solving the internal pressure problem, a method improves the safety of a secondary battery including a non-aqueous electrolyte by mounting a vent or a current breaker to eject internal electrolyte solution when the internal pressure is increased above a predetermined level. However, a problem with the method is that mis-operation may result from an increase in internal pressure itself.

Furthermore, a method in which the SEI-forming reaction is changed by injecting additives into an electrolyte to inhibit the increase in internal pressure is known. For example, Japanese Patent Laid-open No. 97-73918 discloses a method in which high temperature storage characteristics of a battery are improved by adding 1% or less of a diphenyl picrylhydrazyl compound to the electrolyte. Japanese Patent Laid-open No. 96-321312 discloses a method in which cycle life and long-term storage characteristics are improved using 1 to 20% of an N-butyl amine based compound in an electrolyte. Japanese Patent Laid-open No. 96-64238 discloses a method in which storage characteristics of a battery are improved by adding $3 \times 10^{-4}$ to $3 \times 10^{-3}$ M of calcium salt to the electrolyte. Japanese Patent Laid-open No. 94-333596 discloses a method in which storage characteristics of a battery are improved by adding an azo-based compound to inhibit the reaction between an electrolyte and a negative electrode of the battery. In addition, Japanese Patent Laid-open No. 95-320779 discloses a method in which $CO_2$ is added to an electrolyte, and Japanese Patent Laid-open No. 95-320779 discloses a method in which sulfide-based compounds are added to an electrolyte to prevent the electrolyte from decomposing.

The methods as described above induce the formation of an appropriate film on a negative electrode surface such as an organic SEI film by adding a small amount of organic or inorganic materials to improve the storage characteristics and safety of a battery. However, there are various problems with the above methods: the added compound is decomposed or forms an unstable film by interacting with the carbon negative electrode during the initial charge and discharge due to inherent electrochemical characteristics, resulting in the deterioration of the ion mobility in electrons; and gas is generated inside the battery, increasing internal pressure and resulting in significant deterioration of the storage, safety, cycle life, and capacity characteristics of the battery.

SUMMARY OF THE INVENTION

It is an aspect of the present invention to provide a non-aqueous electrolyte for a lithium secondary battery comprising additive compounds that inhibit the generation of gas inside the battery when the battery is stored at a high temperature after charging.

It is another aspect of the present invention to provide a non-aqueous electrolyte for a lithium secondary battery that improves safety by inhibiting overcharge.

It is another aspect of the present invention to provide a lithium secondary battery having effective storage characteristics at high temperature, and good safety.

To accomplish the aspects of the present invention, the present invention provides an electrolyte for a lithium secondary battery, the electrolyte comprising a lithium salt; a non-aqueous organic solvent; and at least one additive compound selected from the group consisting of compounds represented by formulas (1) to (6):

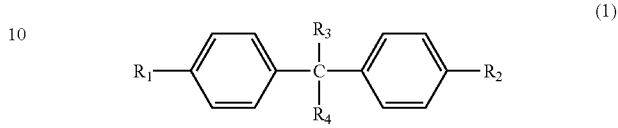

(1)

where $R_1$ and $R_2$ are independently selected from the group consisting of a hydroxy, a $C_1$ to $C_6$ alkoxy, a $C_2$ to $C_6$ alkenyl, a $C_1$ to $C_6$ alkoxy substituted with a halogen, $C_1$ to $C_4$ alkyl, a $C_2$ to $C_4$ alkenyl, a $C_6$ to $C_{14}$ aryl, a $C_3$ to $C_6$ cycloalkyl, a halogen-substituted alkyl group, an alkenyl group, an aryl group, a cycloalkyl group and a $C_2$ to $C_6$ alkenyl substituted with a halogen; and $R_3$ and $R_4$ are independently selected from the group consisting of a $C_1$ to $C_6$ alkyl and a $C_6$ to $C_{12}$ aryl, and a methyl;

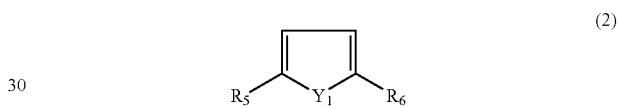

(2)

where $Y_1$ is selected from the group consisting of O, NR (where R is hydrogen, a $C_1$ to $C_6$ alkyl, a $C_6$ to $C_{12}$ aryl, or preferably 1-phenylsulfonyl), and S; and $R_5$ and $R_6$ are independently selected from the group consisting of hydrogen, a $C_1$ to $C_6$ alkyl, a $C_1$ to $C_6$ alkoxy, a $C_2$ to $C_6$ alkenyl, a $C_6$ to $C_{12}$ aryl, and an acetyl, and preferably a methyl;

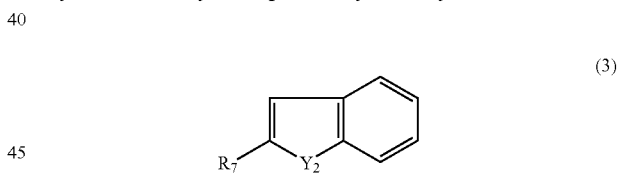

(3)

where $Y_2$ is selected from the group consisting of O, N, and S; and $R_7$ is selected from the group consisting of hydrogen, a $C_1$ to $C_6$ alkyl, a $C_1$ to $C_6$ alkoxy, a $C_2$ to $C_6$ alkenyl, and a $C_6$ to $C_{12}$ aryl;

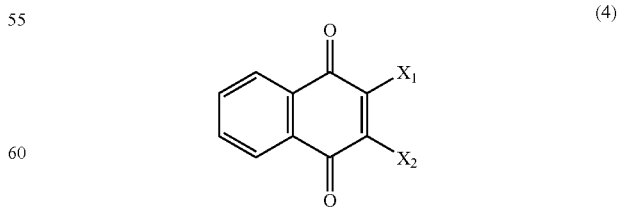

(4)

where $X_1$ and $X_2$ are independently selected from the group consisting of hydrogen and a halogen selected from the group consisting of F, Cl, and Br, and preferably Cl or Br;

$$(5)$$

where $X_3$ and $X_4$ are independently selected from the group consisting of hydrogen and a halogen selected from the group consisting of F, Cl, and Br, and preferably Cl or Br; and $$(6)$$

where $Y_3$ is selected from the group consisting of N, O, and S, and preferably N; $Y_4$ is NR' (where R' is hydrogen or a $C_1$ to $C_6$ alkyl), O, S, or preferably NH; and $R_8$ is selected from the group consisting of hydrogen, a $C_1$ to $C_6$ alkyl, a $C_1$ to $C_6$ alkoxy, a $C_2$ to $C_6$ alkenyl, a $C_6$ to $C_{12}$ aryl, and an acetyl.

Additional aspects and advantages of the invention will be set forth in part in the description which follows and, in part, will be obvious from the description, or may be learned by practice of the invention.

The present invention also provides a lithium secondary battery comprising the electrolyte.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Figure 1:
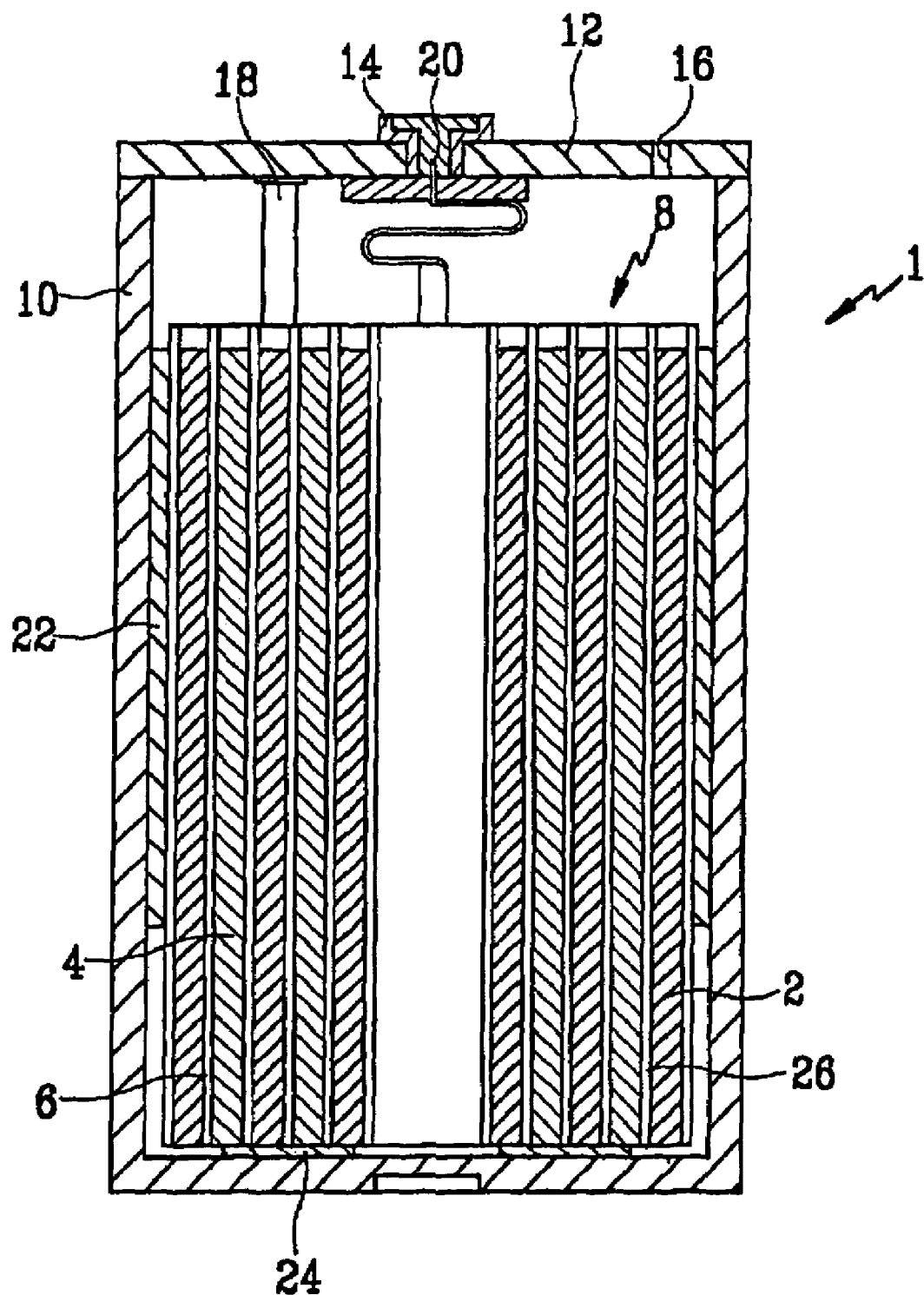
FIG. 1 is a cross-sectional view of a prismatic lithium secondary battery cell.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

In the following detailed description, only selected embodiments of the invention have been shown and described, simply by way of illustration of the best mode contemplated by the inventors of carrying out the invention. As will be realized, the invention may be modified in various respects, all without departing from the invention. Accordingly, the drawings and description are to be regarded as illustrative in nature, and not restrictive.

An electrolyte of the present invention is prepared by adding at least one compound from a group of additive compounds having the following formulas (1) to (6) to a non-aqueous solvent including lithium salts:

$$(1)$$

where $R_1$ and $R_2$ are independently selected from the group consisting of a hydroxy, a $C_1$ to $C_6$ alkoxy, a $C_2$ to $C_6$ alkenyl, a $C_1$ to $C_6$ alkoxy substituted with a halogen, and a $C_2$ to $C_6$ alkenyl substituted with a halogen, and preferably a hydroxy; and $R_3$ and $R_4$ are independently selected from the group consisting of a $C_1$ to $C_6$ alkyl and a $C_6$ to $C_{12}$ aryl, and preferably a methyl;

$$(2)$$

where $Y_1$ is selected from the group consisting of O, NR (where R is hydrogen, a $C_1$ to $C_6$ alkyl, a $C_6$ to $C_{12}$ aryl, or preferably 1-phenylsulfonyl), and S; and $R_5$ and $R_6$ are independently selected from the group consisting of hydrogen, a $C_1$ to $C_6$ alkyl, a $C_1$ to $C_6$ alkoxy, a $C_2$ to $C_6$ alkenyl, a $C_6$ to $C_{12}$ aryl, and an acetyl, and preferably a methyl;

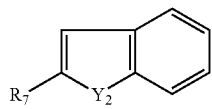
(3)

where $Y_2$ is selected from the group consisting of O, N, and S; and $R_7$ is selected from the group consisting of hydrogen, a $C_1$ to $C_6$ alkyl, a $C_1$ to $C_6$ alkoxy, a $C_2$ to $C_6$ alkenyl, and a $C_6$ to $C_{12}$ aryl;

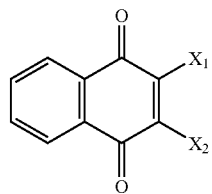
(4)

where $X_1$ and $X_2$ are independently selected from the group consisting of hydrogen and a halogen selected from the group consisting of F, Cl, and Br, preferably Cl or Br;

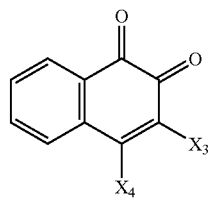
(5)

where $X_3$ and $X_4$ are independently selected from the group consisting of hydrogen and a halogen selected from the group consisting of F, Cl, and Br, and preferably Cl or Br; and

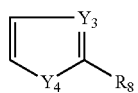
(6)

where $Y_3$ is selected from the group consisting of N, O, and S, preferably N; $Y_4$ is NR' (where R' is hydrogen or a $C_1$ to $C_6$ alkyl), O, S, or preferably NH; and $R_8$ is selected from the group consisting of hydrogen, a $C_1$ to $C_6$ alkyl, a $C_1$ to $C_6$ alkoxy, a $C_2$ to $C_6$ alkenyl, a $C_6$ to $C_{12}$ aryl, and an acetyl.

Conventionally, in order to prevent gas generation, which causes an increase of internal pressure, a method to form an SEI layer to prevent a side reaction between a negative electrode and electrolyte has been developed.

At a high temperature, decomposition of the electrolyte at a surface of the positive electrode actively occurs, which causes an increase of internal pressure of the battery. Accordingly, the present invention uses an additive compound to form a passivation layer on the surface of the positive electrode, resulting in prevention of oxidative decomposition of the electrolyte. The additive compounds are decomposed earlier than an electrolytic organic solvent during initial charging, resulting in the formation of a passivation layer on a surface of the positive electrode, thus inhibiting the decomposition of the electrolytic organic solvent. Swelling of the batteries is prevented during high temperature storage after full charging, since the generation of gas caused by the decomposition of the electrolytic organic solvent is inhibited during initial charging. In addition, there is no deterioration of low temperature and storage characteristics and charge and discharge capacity of the lithium secondary battery. Prevention of swelling during storage at high temperature after full charging improves reliability of batteries after mounting a battery set.

The additive compounds of the present invention start to decompose when the battery voltage approaches an overcharge voltage, and polymerize electrochemically, resulting in the formation of a conductive polymer layer on a surface of the positive electrode. The conductive polymer layer effectively acts as a resister and overcharge inhibitor since the layer is difficult to redissolve. The additive compounds reduce exothermic heat to prevent thermal runaway and improve safety.

Currently used positive active materials include lithium-cobalt-based oxide, lithium-manganese-based oxide, lithium-nickel-based oxide, lithium-nickel-manganese-based oxide, and the like. The lithium-nickel-based or lithium-nickel-manganese-based oxide is inexpensive and provides a high discharge capacity, but has a limitation due to gas generation during high-temperature storage. To solve this problem, there has been research to develop a modified negative active material. The additive-containing electrolyte of the present invention solves the above problem even though a conventional lithium-nickel-based or lithium-nickel-manganese-based oxide is used as a positive active material, and a conventional carbonaceous material is used as a negative active material.

As shown in Table 1, the additive compounds include bisphenol A, 2,5-dimethylfuran, 2-acetylfuran, 2-acetyl-5-methylfuran, 1-(phenylsulfonyl)pyrrole, 2,3-benzofuran, 2-butylbenzofuran, thianaphthene, 2,3-dichloro-1,4-naphthoquinone, 1,2-naphthoquinone, 2,3-dibromo-1,4-naphthoquinone, 3-bromo-1,2-naphthoquinone, 2-methyl imidazole, and the like. The bisphenol A, 2,5-dimethylfuran, 2-butylbenzofuran, thianaphthene, and 2,3-dichloro-1,4-naphthoquinone are preferable.

TABLE 1

| No. | Name | Structure |
|---|---|---|
| No. 1 | Bisphenol A | HO—⌬—C(CH₃)(CH₃)—⌬—OH |
| No. 2 | 2,5-dimethylfuran | H₃C—furan—CH₃ |
| No. 3 | 2-acetylfuran | furan—C(=O)—CH₃ |
| No. 4 | 2-acetyl-5-methylfuran | CH₃—furan—C(=O)—CH₃ |

TABLE 1-continued

| No. 5 | 1-(phenylsulfonyl)pyrrole |
| No. 6 | 2,3-benzofuran |
| No. 7 | 2-butylbenzofuran |
| No. 8 | Thianaphthene |
| No. 9 | 2,3-dichloro-1,4-naphthoquinone |
| No. 10 | 1,2-naphthoquinone |
| No. 11 | 2,3-dibromo-1,4-naphthoquinone |
| No. 12 | 3-bromo-1,2-naphthoquinone |
| No. 13 | 2-methyl imidazole |

The additive compounds are added in substantially an amount of 0.01 to 10 wt %, preferably 0.01 to 5 wt %, more preferably, 0.01 to 1 wt %, and even more preferably, 0.01 to 0.5 wt %, based on the total amount of the electrolyte. The effect of inhibiting the generation of gas inside a battery is not likely when the compounds are used in an amount of less than 0.01 wt %. Battery performance such as cycle life characteristics due to formation of a thick conductive layer to reduce reversibility of the battery is deteriorated when the compound is used in an amount exceeding 10 wt %.

The lithium salt is preferably at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, and LiI.

The concentration of the lithium salt preferably ranges from 0.6 to 2.0 M. When the concentration of the lithium salt is less than 0.6 M, the electrolyte performance deteriorates due to its lack of ionic conductivity. When the concentration of the lithium salt is greater than 2.0 M, the lithium ion mobility deteriorates due to an increase of the electrolyte viscosity, and low temperature performance also deteriorates.

The lithium salt acts in a battery as a supply source of lithium ions, making the basic operation of a lithium secondary battery possible. The non-aqueous organic solvent plays a role of a medium wherein ions capable of participating in the electrochemical reaction are mobilized.

The non-aqueous organic solvent may include a carbonate, an ester, an ether, or a ketone. Examples of carbonates include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Examples of esters include γ-butyrolactone (γ-BL), n-methyl acetate, n-ethyl acetate, n-propyl acetate, etc. Examples of ethers include dibutyl ether, etc. However, the non-aqueous organic solvent is not limited to the above solvent.

It is preferable to use a mixture of a chain carbonate and a cyclic carbonate. The cyclic carbonate and the chain carbonate are preferably mixed together in a volume ratio of 1:1 to 1:9. When the cyclic carbonate and the chain carbonate are mixed in the volume ratio of 1:1 to 1:9, and the mixture is used as an electrolyte, the electrolyte performance may be enhanced.

In addition, the electrolyte of the present invention may further include mixtures of the carbonate solvents and aromatic hydrocarbon solvents of Formula (7):

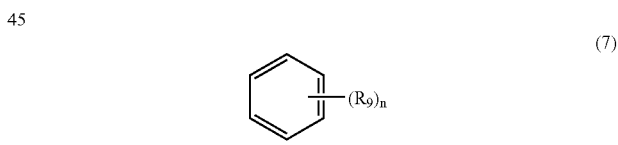

(7)

where $R_9$ is a halogen or a $C_1$ to $C_{10}$ alkyl, and n is an integer of 1 to 6.

Examples of aromatic hydrocarbon solvents include benzene, chlorobenzene, nitrobenzene, fluorobenzene, toluene, trifluorotoluene, and xylene.

The carbonate solvents and the aromatic hydrocarbon solvents are preferably mixed together in a volume ratio of 1:1 to 30:1. When a carbonate solvent and an aromatic hydrocarbon solvent are mixed with each other in the aforementioned volume ratio, and the mixture is used as an electrolyte, the electrolyte performance may be enhanced.

According to another embodiment of the present invention, the organic sulfone-based compound of the following formula (8) may be added to the electrolyte, along with the additive compounds of formulas (1) to (6):

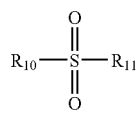

(8)

where $R_{10}$ and $R_{11}$ are independently selected from the group consisting of a primary, secondary, or tertiary alkyl group, an alkenyl group, an cylcoalkyl and an aryl group, and preferably a $C_1$ to $C_4$ alkyl, a $C_2$ to $C_4$ alkenyl, a $C_3$ to $C_6$ cylcoalkyl or a $C_6$ to $C_{14}$ aryl, or $R_{10}$ and $R_{11}$ are bound together to form a cyclic ring. More preferably, one of $R_{10}$ and $R_{11}$ is a halogen-substituted alkyl group, an alkenyl group, an aryl group, or a cycloalkyl group and either of $R_{10}$ or $R_{11}$ is an alkenyl such as vinyl. The organic sulfone-based compound inhibits gas generation on an electrode at a high temperature, and improves cycle life and capacity characteristics. A sulfone-based compound is added to a non-aqueous solvent in substantially an amount of 0.01 to 5 wt %, and preferably 0.01 to 1 wt % of the total amount of the electrolyte.

An electrolyte for a lithium secondary battery of the present invention is stable at a temperature ranging from −20 to 60° C., thus maintaining stable characteristics of the battery even at a voltage of 4 V. The electrolyte of the present invention may be applied to all lithium secondary batteries such as a lithium ion battery, a lithium polymer battery, and the like.

The present invention provides a lithium battery comprising the electrolyte. The lithium battery of the present invention uses a material that reversibly intercalates/deintercalates the lithium ions (lithiated intercalation compound), or a material that reversibly forms a lithium-containing compound, as a positive active material. Examples of the material that reversibly intercalates/deintercalates the lithium ions are a lithium-containing metal oxide or a lithium-containing calcogenide compound such as $LiCoO_2$, $LiNiO_2$, $LiMnO_2$, $LiMn_2O_4$, and $LiNi_{1-x-y}Co_xM_yO_2$ ($0 \leq x \leq 1$, $0 \leq y \leq 1$, $0 \leq x+y \leq 1$, M is a metal such as Al, Sr, Mg, La, or the like.).

The lithium secondary battery of the present invention uses a lithium metal, a lithium-containing alloy, or a material that reversibly intercalates/deintercalates the lithium ions, as a negative active material. Examples of a material that reversibly intercalates/deintercalates the lithium ions are crystalline or amorphous carbon or a carbon complex.

A lithium secondary battery is fabricated by the following process. Positive and negative electrodes are fabricated by coating a slurry, including active materials, on a current collector of an appropriate thickness and length. An electrode assembly is prepared by winding or laminating a positive electrode, a negative electrode, and a separator interposed between the positive and negative electrodes, then placing the electrode assembly into a battery case. An electrolyte of the present invention is injected into the case, and the upper part of the battery case is sealed. The separator interposed between the positive and negative electrodes may be a polyethylene, polypropylene, or polyvinylidene fluoride monolayered separator; a polyethylene/polypropylene double layered separator; a polyethylene/polypropylene/polyethylene three layered separator; or a polypropylene/polyethylene/polypropylene three layered separator.

The present invention is further explained in more detail with reference to the following examples. The examples, however, should not in any sense be interpreted as limiting the scope of the present invention.

EXAMPLES AND COMPARATIVE EXAMPLES

Example 1-26

Ethylene carbonate/ethylmethyl carbonate (EC/EMC) was mixed in a volume ratio of 1:1 to prepare a non-aqueous organic solvent. 1 M $LiPF_6$ was added to the solvent, and additive compounds represented in Table 2 were further added in substantially an amount indicated in Table 2, based on the total weight of electrolyte, to prepare electrolytes.

TABLE 2

| Electrolyte | Additive compounds | Amount of the compounds (wt %) |
|---|---|---|
| Example 1 | Bisphenol A | 0.25 |
| Example 2 | Bisphenol A | 0.5 |
| Example 3 | Bisphenol A | 0.75 |
| Example 4 | Bisphenol A | 1.0 |
| Example 5 | Bisphenol A | 2.0 |
| Example 6 | 2,5-dimethylfuran | 0.5 |
| Example 7 | 2,5-dimethylfuran | 1.0 |
| Example 8 | 2,5-dimethylfuran | 3.0 |
| Example 9 | 2-butylbenzofuran | 0.5 |
| Example 10 | 2-butylbenzofuran | 1.0 |
| Example 11 | 2-butylbenzofuran | 3.0 |
| Example 12 | Thianaphthene | 0.5 |
| Example 13 | Thianaphthene | 1.0 |
| Example 14 | Thianaphthene | 3.0 |
| Example 15 | 2,3-dichloro-1,4-naphthoquinone | 0.5 |
| Example 16 | 2,3-dichloro-1,4-naphthoquinone | 1.0 |
| Example 17 | 2,3-dichloro-1,4-naphthoquinone | 3.0 |
| Example 18 | 2,3-dichloro-1,4-naphthoquinone | 5.0 |
| Example 19 | 1,2-naphthoquinone | 0.5 |
| Example 20 | 2,3-dibromo-1,4-naphthoquinone | 0.5 |
| Example 21 | 3-bromo-1,2-naphthoquinone | 0.5 |
| Example 22 | 2-acetylfuran | 0.5 |
| Example 23 | 2-acetyl-5-methylfuran | 0.5 |
| Example 24 | 2-methyl imidazole | 0.5 |
| Example 25 | 1-(phenylsulfonyl)pyrrole | 0.5 |
| Example 26 | 2,3-benzofuran | 0.5 |

Comparative Example 1

1 M $LiPF_6$ was added to a non-aqueous organic solvent of ethylene carbonate/ethylmethyl carbonate (EC/EMC) mixed in a volume ratio of 1:1 to prepare a non-aqueous electrolyte.

Measurement of Decomposition-initiating Voltage

The decomposition-initiating voltage of the electrolytes according to Examples 2, 6, 9, 12, 15, 19, 20-26, and Comparative Example 1 was measured by LSV (linear sweep voltametry). The decomposition-initiating voltages are represented in Table 3.

TABLE 3

| Electrolyte | Additive compounds | Decomposition-initiating voltage (V) |
|---|---|---|
| Example 2 | Bisphenol A | 4.40 |
| Example 6 | 2,5-dimethylfuran | 4.10 |
| Example 9 | 2-butylbenzofuran | 4.34 |
| Example 12 | Thianaphthene | 4.26 |
| Example 15 | 2,3-dichloro-1,4- | 5.00 |
| Example 19 | 1,2-naphthoquinone | 5.05 |
| Example 20 | 2,3-dibromo-1,4- | 5.05 |
| Example 21 | 3-bromo-1,2-naphthoquinone | 5.00 |
| Example 22 | 2-acetyl furan | 4.96 |
| Example 23 | 2-acetyl-5-methylfuran | 4.63 |
| Example 24 | 2-methyl imidazole | 4.57 |
| Example 25 | 1-(phenylsulfonyl)pyrrole | 4.68 |
| Example 26 | 2,3-benzofuran | 4.43 |

TABLE 3-continued

| Electrolyte | Additive compounds | Decomposition-initiating voltage (V) |
|---|---|---|
| Comparative Example 1 | No additive compound | 5.70 |

The conditions for measurement of the decomposition-initiating voltages were as follows:

working electrode: Pt; reference electrode: Li-metal; counter electrode: Li-metal; voltage range: 3 V to 7 V; scan rate: 5 mV/s.

As shown in Table 3, the electrolytes of the Examples have a decomposition-initiating voltage that is lower than the decomposition-initiating voltage of the electrolyte of Comparative Example 1. Accordingly, the electrolytes of the Examples decompose earlier during initial charging, and a conductive polymer layer is formed on the positive electrode at the above decomposition-initiating voltage.

Figure 2:
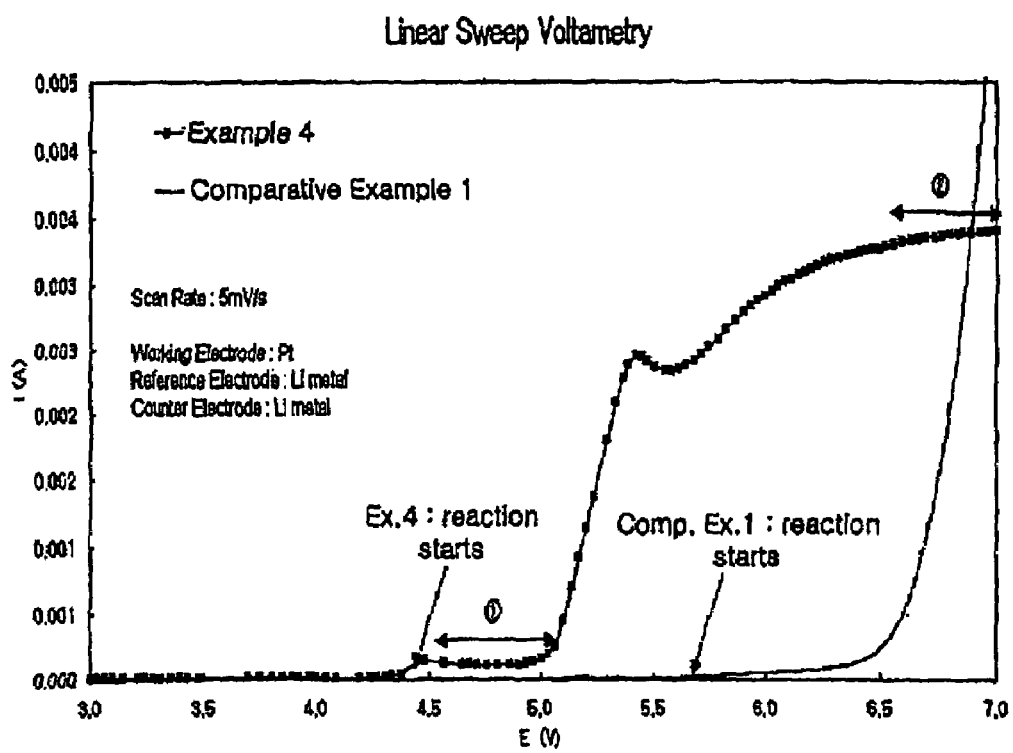
FIG. 2 is graph illustrating measurement results of decomposition initiation voltage using LSV (linear sweep voltametry) with respect to electrolytes of Example 4 of the present invention and Comparative Example 1.
Figure 3:
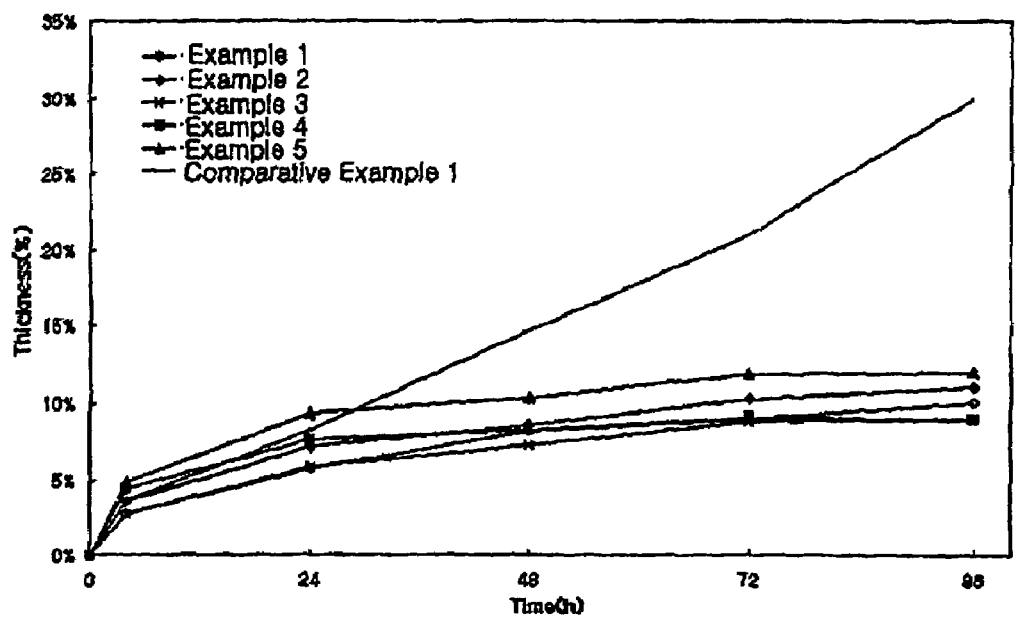
FIG. 3 is a graph illustrating thickness variation measured every 24 hours after batteries comprising electrolytes of Examples 1-5 and Comparative Example 1 were placed in a chamber at 85° C. for four days.
Figure 4:
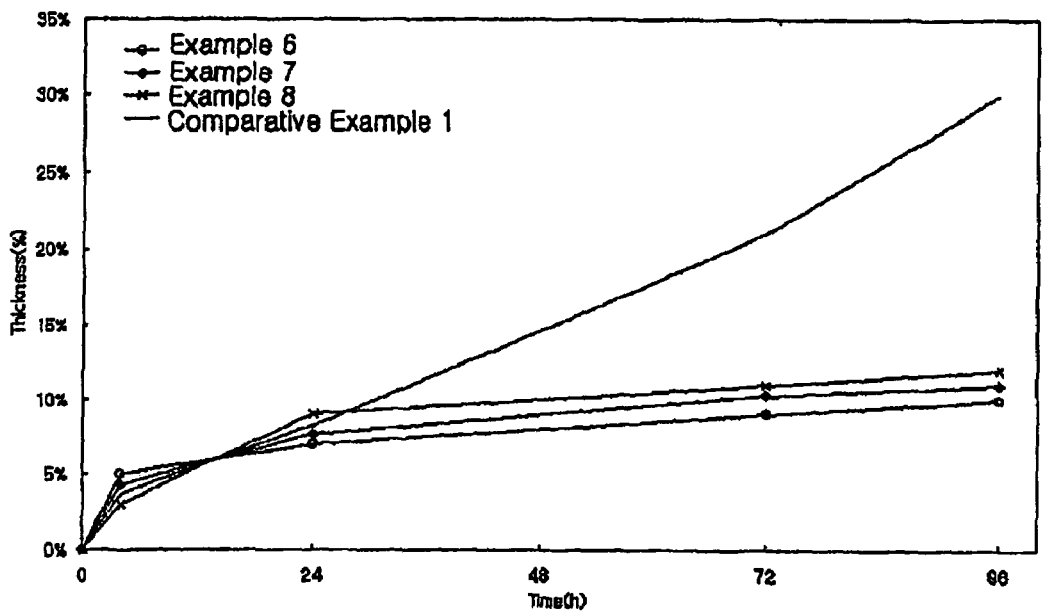
FIG. 4 is a graph illustrating thickness variation measured every 24 hours after batteries comprising electrolytes of Examples 6-8 and Comparative Example 1 were placed in a chamber at 85° C. for four days.
Figure 5:
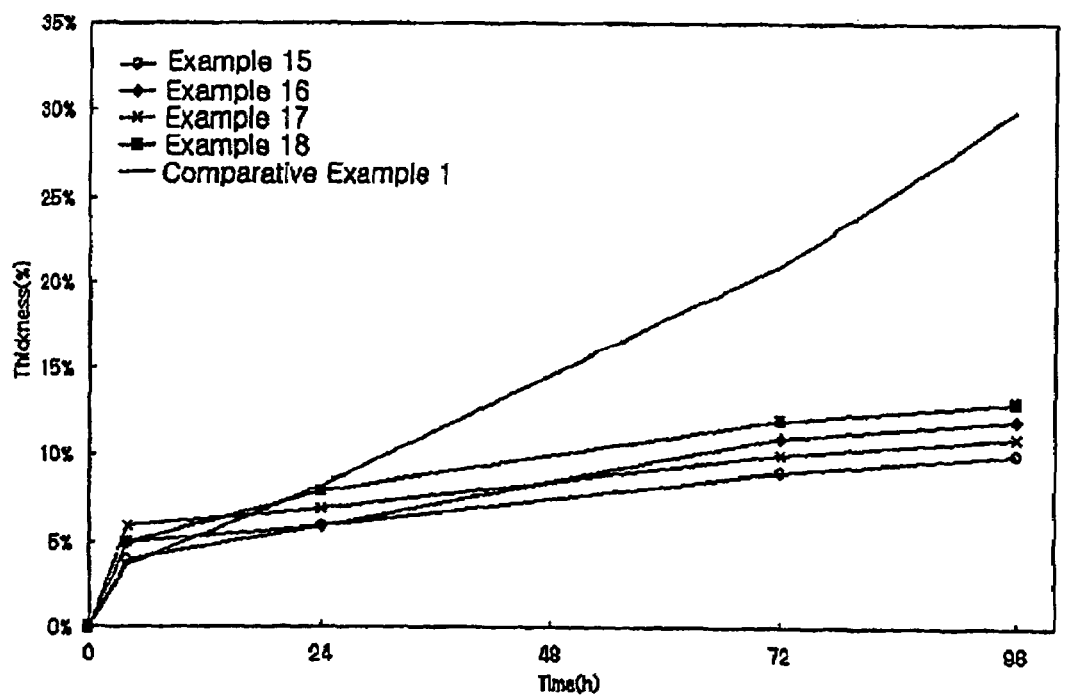
FIG. 5 is a graph illustrating thickness variation measured every 24 hours after batteries comprising electrolytes of Examples 15-18 and Comparative Example 1 were placed in a chamber at 85° C. for four days.
Figure 6:
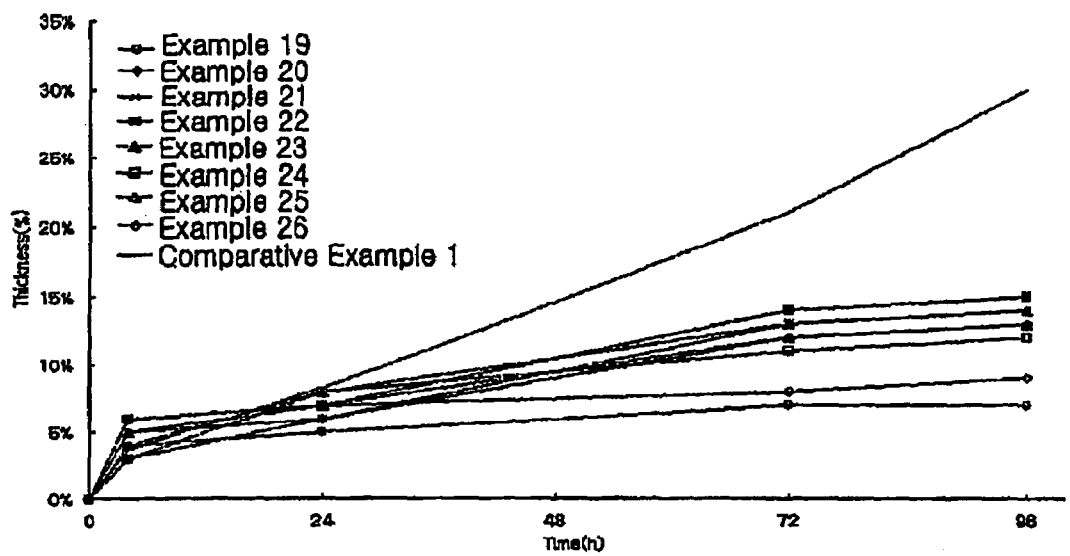
FIG. 6 is a graph illustrating thickness variation measured every 24 hours after batteries comprising electrolytes of Examples 19-26 and Comparative Example 1 were placed in a chamber at 85° C. for four days.

FIG. 2 shows the measurement results of the decomposition-initiating voltage with respect to electrolytes of Example 4 and Comparative Example 1 using LSV (linear sweep voltametry). As shown in FIG. 2, the electrolyte of Example 4 has a decomposition-initiating voltage of 4.4 V, while the decomposition-initiating voltage of Comparative Example 1 is 5.7 V. The electrolyte of Example 4, to which bisphenol A was added, has a decomposition voltage lower than the decomposition-initiating voltage of the electrolyte of Comparative Example 1, to which bisphenol A was not added. Accordingly, the electrolyte of Example 4 decomposes earlier during initial charging, and a conductive polymer layer is formed on the positive electrode. The conductive polymer layer prevents decomposition of carbonate-based organic solvent and gas generation caused thereby, resulting in a reduction of the internal pressure of the battery and an increase in the thickness after full charging. In the LSV curve of Example 4 of FIG. 2, it is assumed that the 4.5-5 V region indicated as (1) represents maintenance of an established current indicating that reaction for forming a passivation layer occurs and the 6.5-7 V region indicated as (1) represents maintenance of an established current that advantageously acts to improve safety of the battery.

Fabrication of Lithium Secondary Batteries

After LiCoO$_2$ (as a positive active material), polyvinylidenefluoride (PVdF) (as a binder), and acetylene black (as a conductive agent) were mixed in a weight ratio of 92:4:4, a positive active material slurry was prepared by dispersing the mixture into N-methyl-2-pyrrolidone (NMP). The slurry was coated on a 20 μm thick aluminum foil, dried, and compressed, thus manufacturing a positive electrode. After mixing crystalline artificial graphite as a negative active material with PVdF as a binder in a weight ratio of 92:8, a negative active material slurry was prepared by dispersing the mixture in NMP. The slurry was coated on a 15 μm thick copper foil, dried, and compressed, thus manufacturing a negative electrode. Together with a 25 μm thick polyethylene separator, the manufactured electrodes were wound and pressed, then placed into prismatic cans having the dimensions of 30 mm×48 mm×6 mm. The electrolytes of Examples 1-26 and Comparative Example 1 were injected into the cans, thus completing the fabrication of the prismatic lithium ion battery cell.

Thickness Increase Rate of Cells After Charging and Cycle Life Characteristics

The lithium battery cells fabricated by injecting electrolytes according to Examples 1-26 and Comparative Example 1 were charged with a current of 166 mA to a cut-off voltage of 4.2 V under constant current and constant voltage (CC-CV), allowed to sit for 1 hour, then discharged to a cut-off voltage of 2.75 V with a current of 166 mA, and were allowed to sit for 1 hour. After 3 charge/discharge cycles were performed, the battery cells were fully charged with a current of 415 mA to a cut-off charge voltage of 4.2 V, over 3 hours. They were placed in a chamber at a high temperature (85° C.) for 4 days. The thickness of each cell after charging was measured every 24 hours to find the increase rates of the thickness of the cells (relative to the thickness measured after cell fabrication). The measurement results of Examples 1 to 26 and Comparative Example 1 are shown in Table 4 and FIGS. 3-6. The results of Examples 1 to 5, Examples 6 to 8, Examples 15 to 18, and Examples 19 to 26 are represented in FIGS. 3, 4, 5, and 6 respectively. The thickness data of Table 4 and FIGS. 3-6 are average values of 10 test cells. For easy comparison, the result of Comparative Example 1 is also represented.

The lithium ion battery cells, which were manufactured with the electrolyte of Examples 1 to 26 and Comparative Example 1, were charged at 1 C to a cut-off voltage of 4.2 V under CC-CV, and the cells were discharged at 1 C to a cut-off voltage of 3.0 V under CC at 1 C. 300 cycles of charge and discharge of the cells were performed, and the cycle life characteristics (capacity retention) of the cells were measured. The results pertaining to Examples 1 to 26 and Comparative Example 1 are shown in Table 4. The capacity retention data of Table 4 are average values of 10 test cells.

TABLE 4

|  | Thickness increasing rate after allowing the cells to stand for 4 days | Capacity retention after 100 cycles | Capacity retention after 300 cycles |
|---|---|---|---|
| Example 1 | 10% | 97% | 90% |
| Example 2 | 11% | 96% | 89% |
| Example 3 | 9% | 95% | 88% |
| Example 4 | 9% | 93% | 87% |
| Example 5 | 12% | 91% | 85% |
| Example 6 | 10% | 97% | 87% |
| Example 7 | 10% | 94% | 88% |
| Example 8 | 12% | 95% | 86% |
| Example 9 | 12% | 98% | 85% |
| Example 10 | 10% | 97% | 88% |
| Example 11 | 9% | 96% | 89% |
| Example 12 | 15% | 98% | 87% |
| Example 13 | 12% | 97% | 88% |
| Example 14 | 13% | 96% | 85% |
| Example 15 | 10% | 95% | 84% |
| Example 16 | 12% | 93% | 87% |
| Example 17 | 11% | 94% | 86% |
| Example 18 | 13% | 92% | 84% |
| Example 19 | 7% | 94% | 83% |
| Example 20 | 15% | 95% | 84% |
| Example 21 | 16% | 97% | 84% |
| Example 22 | 16% | 97% | 83% |
| Example 23 | 14% | 95% | 85% |
| Example 24 | 12% | 96% | 83% |
| Example 25 | 14% | 96% | 85% |
| Example 26 | 9% | 93% | 84% |
| Comparative Example 1 | 30% | 90% | 80% |

As shown in Table 4 and FIGS. 3 to 6, the increases in thickness of the lithium ion cells into which the electrolytes of Examples were injected were substantially less than the thickness of the lithium ion cell into which the electrolyte of Comparative Example 1 was injected. Table 4 shows that the capacity retentions after 100 and 300 cycles of the cells including electrolytes of Examples 1 to 26 were much better than the capacity retention of Comparative Example 1, indicating that the cells including electrolytes of Examples 1 to 26 have effective cycle life characteristics.

Figure 7:
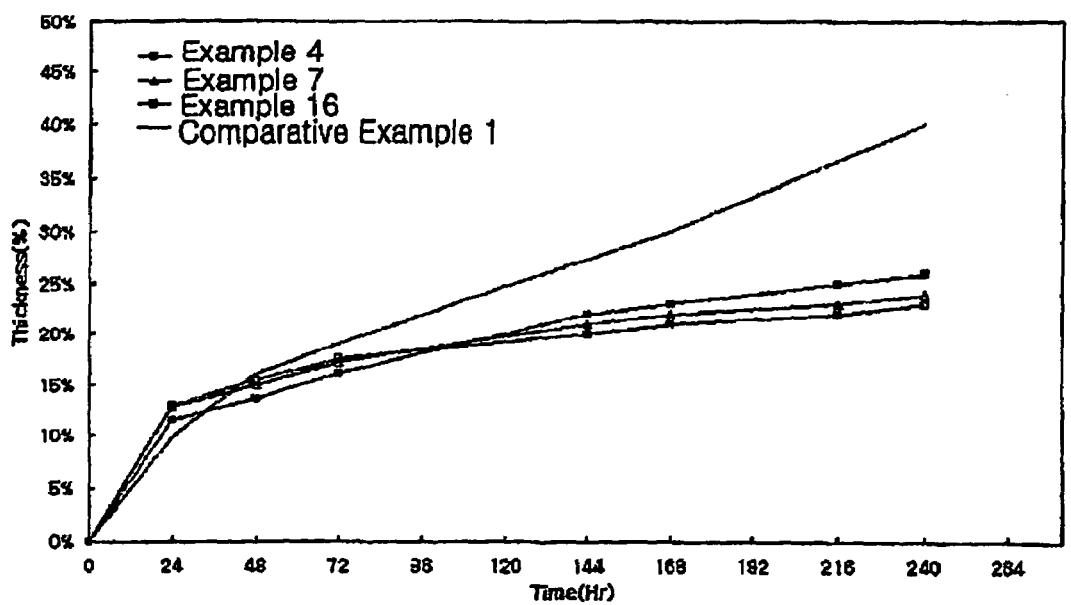
FIG. 7 is a graph illustrating thickness variation measured every 24 hours after batteries comprising electrolytes of Examples 4, 7, and 16 and Comparative Example 1 were placed in a chamber at 80° C. for ten days.

FIG. 7 shows the thickness variation of the lithium ion cells into which the electrolytes of Examples 4, 7, and 16, and Comparative Example 1 were injected, after being placed in a chamber at a high temperature (80° C.) for 10 days. As shown in FIG. 7, the cells including electrolytes of Example 4, 7, and 16 had a significantly less thickness increase rate than that of Comparative Example 1, even after being placed at a high temperature for long periods of time.

Figure 8:
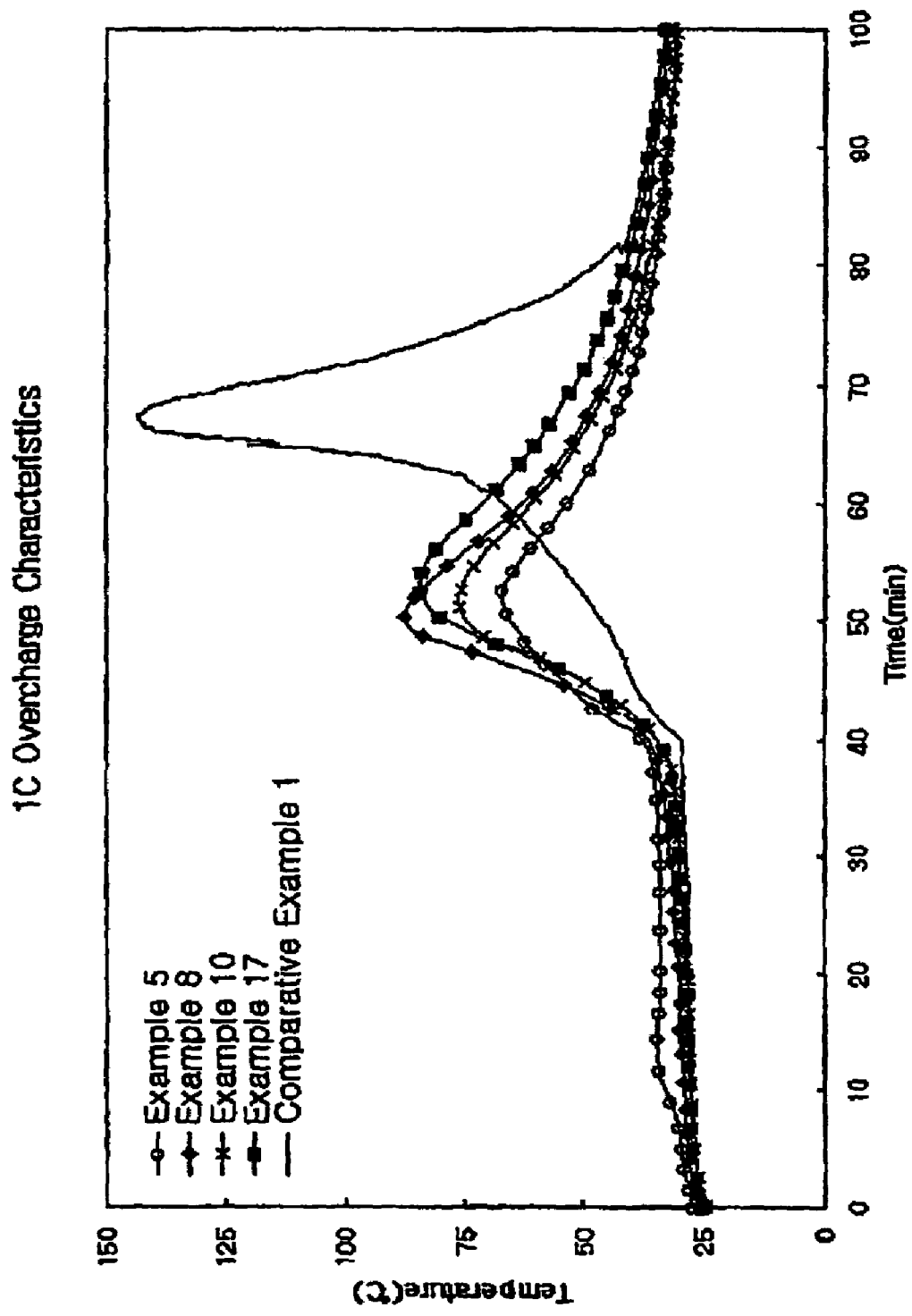
FIG. 8 is a graph illustrating cell temperature of batteries according to Examples 5, 8, 10, and 17 of the present invention and Comparative Example 1 when the batteries were overcharged at 1C to a voltage of 12 V for 2 hours.

FIG. 8 shows the surface temperatures of lithium ion cells, including electrolytes of Example 5, 8, 10, and 17, and Comparative Example 1, when overcharging the cells at 1 C at the voltage of 12 V for 2 hours. As shown in FIG. 8, the cells of Examples 5, 8, 10, and 17 had a negligible increase in temperature after about 40 minutes had lapsed after charging, since exothermic heat was reduced by adding the additive compounds to electrolyte. Accordingly, the additive compounds act as inhibitors of thermal runaway during overcharge, resulting in safety improvement. To the contrary, the cell of Comparative Example 1 showed an abrupt increase of temperature to 140° C. or over after 40 minutes had lapsed.

10 test cells, including electrolytes of Example 4, 7, 11, 14, 17, and 19, and Comparative Example 1, were evaluated with respect to safety during heat exposure. Each cell was exposed to heat of 150° C. for 1 hour, and the status of each cell was evaluated. The results are shown in Table 5.

TABLE 5

|  | Safety at heat exposure* |
| --- | --- |
| Example 4 | 9L0, 1L1 |
| Example 7 | 10L0 |
| Example 11 | 10L0 |
| Example 14 | 10L0 |
| Example 17 | 9L0, 1L1 |
| Example 19 | 8L0, 2L1 |
| Comparative Example 1 | 5L4, 5L5 |

The number preceding "L" indicates the number of tested cells.
The results of the safety test were rated as follows:
L0: good,
L1: leakage,
L2: flash,
L2: flame,
L3: smoke,
L4: ignition,
L5: explosion.

As shown in Table 5, the cells of the Examples have much better safety characteristics, for example, when being subjected to overcharge and heat exposure, as well as having more desirable storage characteristics at high temperature and cycle life than the storage characteristics and cycle life of the cell of Comparative Example 1.

The additive compounds added to the electrolyte of the present invention decompose earlier than an organic solvent alone to form a conductive polymer layer on the surface of a positive electrode, and prevent decomposition of the organic solvent. Accordingly, the electrolyte of the present invention inhibits gas generation caused by decomposition of the organic solvent at initial charging, and thus reduces an increase of internal pressure and swelling during high temperature storage, and improves the safety of the battery during overcharge.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be utilized that fall within the scope of the invention and the appended claims.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A non-aqueous electrolyte of a lithium secondary battery, comprising:
a lithium salt;
an organic solvent; and
at least one additive compound substantially in an amount of 0.01 to 10 wt %, based on a total weight of electrolyte and selected from the group consisting of compounds represented by the following formula (1):

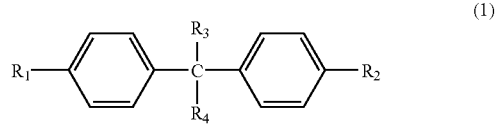

where $R_1$ and $R_2$ are independently selected from the group consisting of a hydroxy, a $C_1$ to $C_6$ alkoxy, a $C_2$ to $C_6$ alkenyl, a $C_1$ to $C_6$ alkoxy substituted with a halogen, and a $C_2$ to $C_6$ alkenyl substituted with a halogen; and $R_3$ and $R_4$ are independently selected from the group consisting of a $C_1$ to $C_6$ alkyl and a $C_6$ to $C_{12}$ aryl.

2. The non-aqueous electrolyte of a lithium secondary battery according to claim 1, wherein the additive compound is used substantially in an amount of 0.01 to 5 wt %, based on a total weight of electrolyte.

3. The non-aqueous electrolyte of a lithium secondary battery according to claim 2, wherein the additive compound is used substantially in an amount of 0.01 to 1 wt %, based on a total weight of electrolyte.

4. The non-aqueous electrolyte of a lithium secondary battery according to claim 3, wherein the additive compound is used substantially in an amount of 0.01 to 0.5 wt %, based on a total weight of electrolyte.

5. The non-aqueous electrolyte of a lithium secondary battery according to claim 1, wherein the additive compound forms a passivation layer on a surface of a positive electrode.

6. The non-aqueous electrolyte of a lithium secondary battery according to claim 1, wherein the lithium salt is at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, and LiI.

7. The non-aqueous electrolyte of a lithium secondary battery according to claim 6, wherein the lithium salt is used substantially at a concentration in the range of 0.6 to 2.0 M.

8. The non-aqueous electrolyte of a lithium secondary battery according to claim 1, wherein the organic solvent is at least one non-aqueous organic solvent selected from the group consisting of a carbonate, an ester, an ether, and a ketone.

9. The non-aqueous electrolyte of a lithium secondary battery according to claim 8, wherein the carbonate is selected from the group consisting of dimethyl carbonate (DM0), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC).

10. The non-aqueous electrolyte of a lithium secondary battery according to claim 8, wherein the carbonate is a mixed solvent of a cyclic carbonate and a chain carbonate.

11. The non-aqueous electrolyte of a lithium secondary battery according to claim 1, wherein the organic solvent comprises a mixed solvent of a carbonate solvent and an aromatic hydrocarbon solvent.

12. The non-aqueous electrolyte of a lithium secondary battery according to claim 11, wherein the aromatic hydrocarbon solvent is a compound of Formula (7):

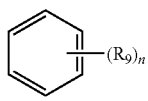
(7)

where $R_9$ is selected from a group consisting of a halogen, and a $C_1$ to $C_{10}$ alkyl, and n is an integer of 1 to 6.

13. The non-aqueous electrolyte of a lithium secondary battery according to claim 11, wherein the aromatic hydrocarbon solvent is at least one selected from the group consisting of benzene, fluorobenzene, toluene, trifluorotoluene, xylene, and mixtures thereof.

14. The non-aqueous electrolyte of a lithium secondary battery according to claim 11, wherein the carbonate solvent and the aromatic hydrocarbon solvent are mixed in a volume ratio of 1:1 to 30:1.

15. The non-aqueous electrolyte of a lithium secondary battery according to claim 1, wherein the electrolyte further comprises an organic sulfone-based compound.

16. The non-aqueous electrolyte of a lithium secondary battery according to claim 15, wherein the organic sulfone-based compound is represented by the following formula (8):

(8)

where $R_{10}$ and $R_{11}$ are independently selected from the group consisting of a primary alkyl group, a secondary alkyl group, a tertiary alkyl group, an alkenyl group, a cycloalkyl group, an aryl group, or $R_{10}$ and $R_{11}$ are bound together to form a cyclic ring.

17. The non-aqueous electrolyte for a lithium secondary battery according to claim 16, wherein either of $R_{10}$ or $R_{11}$ is substantially vinyl.

18. The non-aqueous electrolyte for a lithium secondary battery according to claim 15, wherein the organic sulfone-based compound is used substantially in an amount of 0.01 to 5 wt % based on a total weight of electrolyte.

19. A non-aqueous electrolyte of a lithium secondary battery, comprising:
   a lithium salt;
   an organic solvent; and
   an additive compound, wherein the additive compound is bisphenol A,
   wherein the additive compound is used substantially in an amount of 0.01 to 10 wt %, based on a total weight of electrolyte.

* * * * *

UNITED STATES PATENT AND TRADEMARK OFFICE
CERTIFICATE OF CORRECTION

| | | |
|---|---|---|
| PATENT NO. | : 7,553,588 B2 | Page 1 of 1 |
| APPLICATION NO. | : 10/658272 | |
| DATED | : June 30, 2009 | |
| INVENTOR(S) | : Jin-Hee Kim et al. | |

It is certified that error appears in the above-identified patent and that said Letters Patent is hereby corrected as shown below:

Title Page, item (75) Inventors, second inventor's city "Che nan" should be --Cheonan--;

Title Page (Page 2), item (56) References Cited, Other Publications, second to the last line, "pp. 679-583" should be --579-583--;

Column 17, line 3, change "(DM0)" to --(DMC)--.

Signed and Sealed this

Tenth Day of November, 2009

David J. Kappos
*Director of the United States Patent and Trademark Office*